(12) United States Patent
Lenard et al.

(10) Patent No.: US 8,721,397 B2
(45) Date of Patent: May 13, 2014

(54) DEVICE FOR MACHINING, IN PARTICULAR ERODING AND GRINDING, ROTATIONAL WORK-PIECES PROVIDED WITH CUTTING EDGES

(75) Inventors: Peter Lenard, Biberach/Riss (DE); Siegfried Veil, Ochsenhausen (DE); Peter Bailer, Schemmerhofen-Altheim (DE); Norbert Bailer, Schemmerhofen-Altheim (DE); Stefan Brand, Mietingen-Walpertshofen (DE)

(73) Assignee: Vollmer Werke Maschinenfabrik GmbH, Biberach/Riss (DE)

( * ) Notice: Subject to any disclaimer, the term of this patent is extended or adjusted under 35 U.S.C. 154(b) by 769 days.

(21) Appl. No.: 12/321,203

(22) Filed: Jan. 20, 2009

(65) Prior Publication Data

US 2009/0209180 A1    Aug. 20, 2009

(30) Foreign Application Priority Data

Jan. 17, 2008    (DE) .......................... 10 2008 004 851

(51) Int. Cl.
*B24B 3/24*    (2006.01)
(52) U.S. Cl.
CPC ........................................ *B24B 3/24* (2013.01)
USPC ........................................... 451/140; 451/143
(58) Field of Classification Search
CPC .............. B24B 3/24; B24B 3/28; B24B 3/30
USPC .................. 451/8, 48, 119, 123, 140, 143
See application file for complete search history.

(56) References Cited

U.S. PATENT DOCUMENTS

| 2,353,131 | A | * | 7/1944 | Ford .............................. 451/278 |
| 3,114,988 | A | * | 12/1963 | Garrison ........................ 451/159 |
| 3,656,264 | A | * | 4/1972 | Mackey et al. .................. 451/48 |
| 4,186,529 | A | * | 2/1980 | Huffman .......................... 451/4 |
| 4,241,639 | A | * | 12/1980 | Baer ........................... 411/387.8 |
| 5,868,606 | A | * | 2/1999 | Martin ............................. 451/48 |
| 6,190,242 | B1 | * | 2/2001 | Herrscher et al. ............. 451/177 |
| 7,143,489 | B1 | * | 12/2006 | Giebmanns ................... 29/38 A |
| 2006/0194513 | A1 | * | 8/2006 | Saxler et al. ..................... 451/8 |
| 2009/0124171 | A1 | * | 5/2009 | Braun ............................. 451/33 |

FOREIGN PATENT DOCUMENTS

| DE | 1000 02 053 C2 | 3/2002 |
| DE | 101 11 098 A1 | 9/2002 |
| DE | 10 2005 020 035 A1 | 11/2006 |

* cited by examiner

*Primary Examiner* — Maurina Rachuba
(74) *Attorney, Agent, or Firm* — Krieg DeVault LLP (57) ABSTRACT

The invention relates to a device (10) for machining, in particular eroding and grinding, rotational workpieces (44) provided with cutting edges, with a machine base (12), a machining mechanism (14), which can be displaced relative to the machine base (12), and a workpiece positioning mechanism (18), which can be displaced relative to the machine base (12), wherein the machining mechanism (14) has at least one machining tool (30), which is attached in a rotatably drivable manner to a slide arrangement (20), which can be displaced in relation to the machine base (12), for machining a functional portion to be machined of the rotational workpiece (44), and wherein the workpiece positioning mechanism (18) has a workpiece holding mechanism (46), which can be displaced relative to the machine base (12) and holds a holding portion of the rotational workpiece (44) directly or via a holding adapter for attaching the rotational workpiece (44) to the workpiece positioning mechanism (18). In this device the workpiece holding mechanism (46) is oriented relative to the machine base (12) and holds the holding portion of the rotational workpiece (44) such that the rotational workpiece (44) is arranged with its functional portion suspended substantially in the vertical direction for machining.

16 Claims, 10 Drawing Sheets

DEVICE FOR MACHINING, IN PARTICULAR ERODING AND GRINDING, ROTATIONAL WORK-PIECES PROVIDED WITH CUTTING EDGES

CROSS REFERENCE TO RELATED APPLICATIONS

The present application claims priority to German Patent Application No. 10 2008 004 851.8, filed Jan. 17, 2008, which is incorporated herein by reference.

The present invention relates to a device for machining, in particular eroding and grinding, rotational workpieces provided with cutting edges, with a machine base, a machining mechanism, which can be displaced relative to the machine base, and a workpiece positioning mechanism, which can be displaced relative to the machine base, wherein the machining mechanism has at least one machining tool, which is attached in a rotatably drivable manner to a slide arrangement, which can be displaced in relation to the machine base, for machining a functional portion to be machined of the rotational workpiece, and wherein the workpiece positioning mechanism has a workpiece holding mechanism, which can be displaced relative to the machine base and holds a holding portion of the rotational workpiece directly or via a holding adapter for attaching the rotational workpiece to the workpiece positioning mechanism.

A large number of machine tools with which different types of workpieces can be machined are known from the prior art. However a particular machining situation arises when rotational workpieces with cutting teeth have to be machined. These are workpieces which in turn are used as tools in certain machines, such as, for example, milling cutters or drills, and wear with time during this use, so that they must be re-sharpened. Workpieces of this kind which are used as tools have a holding portion with which they are clamped in the respective machining machine in their function as a tool. Tools of this kind also have a functional portion provided with cutting teeth, cutting lips or cutting tips, for example. The functional portion is usually formed with a relatively complicated geometry. The workpiece must be positioned very accurately in order to machine this functional portion in the course of a grinding process or an eroding process. The machining tool for machining the functional portion must be brought up to the workpiece in a quite specific relative position in order to achieve sufficiently good machining results, in particular also on account of the complicated geometry of the cutting edges. The above description shows that the machining of rotational workpieces of the type described above makes special demands on the machine tool which is used.

A device of the type initially described is known, for example, from the document DE 10 2005 020 035 A1. In the case of this device a machining mechanism is arranged on a machining bridge. The machining mechanism has a machining tool which is suspended substantially in the vertical direction. However the workpiece to be machined is attached to a workpiece positioning mechanism, and this orients the workpiece substantially in the horizontal direction, so that the functional portion of the rotational workpiece is directed more or less horizontally, depending on the tilt position.

However it has become apparent that, on account of their own weight, rotational workpieces of a relatively long axial length, such as drills or end milling cutters, are in particular subject to a certain bending load and in the described clamping situation deform—even though only to a slight degree—due to this bending load. Bending deformation of this kind must be taken into account when machining the workpiece in order to achieve high-quality machining results. Moreover, undesirable vibrations occur at the workpiece when the latter is displaced on account of its substantially horizontal orientation. The gravitational forces acting on the horizontally oriented workpiece transversely to its longitudinal extent result in a prestressed system which during machining, for example by means of a grinding wheel, can only be controlled at an increased technical expense on account of the additionally occurring machining forces.

Also known from the prior art are devices in which a workpiece to be machined is clamped in a vertical orientation, with the holding portion of the workpiece being held in a holder which is arranged below the machining tool. A device of this kind is presented in the document DE 101 11 098 A1, for example. The functional portion to be machined thus projects upwards out of the workpiece holder. Although devices of this kind are not subject to the problem of a gravitation-induced bending load on the workpiece, a fundamental disadvantage of devices of this kind lies in the fact that chips and removed material occurring during machining fall into the workpiece holder due to gravity and contaminate this. Eccentric clamping can as a result occur when changing workpieces, so that high-quality machining is no longer possible. In order to prevent this as far as possible, the workpiece holder must always be cleaned in an extremely careful and time-consuming manner, which slows down the machining process significantly.

Also known from the prior art are lathes in the case of which the workpiece to be machined is clamped in a rotating spindle, the latter being oriented substantially in the vertical direction. The machining tool is therefore suspended vertically downwards out of the rotating spindle. The non-rotating turning tool which is used is brought up to the workpiece in linear fashion for machining. In the case of these lathes the vertical orientation of the rotating spindle was primarily selected in order for them to be of a very narrow construction in the horizontal direction, so that a plurality of lathes of this kind can be arranged next to one another in a space-saving manner. Lathes of this kind are not suitable for the complex machining situations described above with rotational workpieces which are used as tools.

A comparable arrangement is also presented in the document DE 100 02 053 C2.

The object of the present invention is to provide a device of the type initially described with which complex machining situations for machining rotational workpieces which can be used as tools can be reliably implemented while avoiding the problems from the prior art described above with regard to faulty clamping of the workpiece as well as contamination of the clamping system.

This object is achieved by a device of the type initially described in which the workpiece holding mechanism is oriented relative to the machine base and holds the holding portion such that the rotational workpiece is arranged with its functional portion suspended substantially in the vertical direction for machining.

The problem of gravity-induced faulty clamping of a workpiece when the later is oriented horizontally is countered according to the invention by holding the rotational workpiece to be machined in the device in a suspended manner and bringing the machining mechanism up to the suspended rotational workpiece through horizontal displacement. Gravity-induced bending loads can be effectively prevented through the suspended arrangement of the rotational workpiece, as gravity acts in the axial direction of the rotational workpiece. Furthermore, the clamping solution according to the present invention with a suspended rotational workpiece leads to the positive effect of preventing material chips resulting during machining or other types of contamination from falling into the workpiece holding mechanism and thus significantly contaminating this. In the case of the present invention the chips resulting during machining instead fall downwards due to gravity, that is away from the workpiece holding mechanism.

According to one constructional variant of the invention, the slide arrangement can have a first positioning slide and a second positioning slide with horizontally extending axes of motion which are substantially orthogonal to one another. The machining tool can as a result be displaced as desired into a horizontal position, just as with a conventional compound slide arrangement.

According to the invention, in order to drive the machining tool, the machining mechanism can have a machining spindle which can be driven so as to rotate about a machining spindle axis. This spindle is attached, for example, to the compound slide arrangement and can thus be positioned as desired. A machining mechanism with a wire spark eroding device can also be used as an alternative.

The complex machining situations described above when machining rotational workpieces provided with cutting teeth frequently make it necessary, in addition to the usual translational displacement of the rotational workpiece and the machining tool in relation to one another, also to arrange these components obliquely in relation to one another. According to the invention, in order to achieve an oblique arrangement of this kind, the machining mechanism can have a spindle pivoting mechanism by means of which the machining spindle can be pivoted about a spindle pivot axis such that the machining spindle axis can be brought both into a horizontal and into a vertical position as well as into intermediate positions. It is possible according to the invention to pivot the machining spindle axis through up to 210° or more about the spindle pivot axis. This enables the machining tool to be brought into any desired angular orientation relative to the rotational workpiece to be machined, so that complex machining situations on account of a complex geometry of the functional portion can also be managed.

In one development of the invention the workpiece positioning mechanism has a workpiece holding spindle which can be driven so as to rotate about a workpiece holding spindle axis. This measure enables the rotational workpiece to be brought into any desired rotational position about its longitudinal axis and fixed in this. It also enables any desired points on the functional portion of the rotational workpiece to be machined with the machining tool.

It is also possible for the workpiece positioning mechanism to have a spindle tilting mechanism by means of which the workpiece holding spindle can be pivoted about a spindle tilting axis such that the rotational workpiece to be machined can be brought into a vertical oblique position. In this connection it is to be noted that, in spite of the oblique position, the basic orientation of the rotational workpiece remains substantially vertical. For example, a maximum oblique position of +/−15° from the exact vertical orientation is provided for. Due to the possibility of an oblique position of the rotational workpiece for machining, further freedoms for machining complex geometries of functional portions on rotational workpieces are obtained.

Different axes of the device according to the invention as well as the possibilities resulting therefrom for machining the rotational workpiece were in particular described above. In addition to extensive possibilities for selecting different relative positions of the rotational workpiece and the machining tool, a relatively large selection of different machining tools is also required for managing complex machining situations. In this connection it is to be borne in mind that a coolant supply which is adapted to the respective machining tool and the machining situations is also required for high-quality machining with a sufficiently good machining result. In order to meet this requirement, according to one constructional variant of the invention, the machining mechanism can also be coupled to a tool carrier on which a machining tool and a coolant/lubricant supply arrangement associated therewith are provided. This constructional variant ensures that the tool carrier retains a specific machining tool in a mobile manner and has a coolant/lubricant supply arrangement associated therewith and adapted thereto. In this respect the coolant/lubricant supply arrangement can be specially geared to the machining tool arranged in the tool carrier.

According to one development of the invention, in order to provide a plurality of different types of machining tools, a plurality of tool carriers can be attached to a tool carrier magazine, which can preferably be rotatably driven and is in particular disc-shaped or pallet-like. In this case each tool carrier has a specific machining tool and the coolant/lubricant supply arrangement associated therewith.

In this connection, according to one development of the invention, in order to easily couple the tool carrier, machining tool and coolant/lubricant supply arrangement to the machining mechanism, each tool carrier can have a predefined interface for fixing to the machining mechanism, for connecting a coolant/lubricant supply and for coupling the machining tool to the machining spindle. In this way a combination of machining tool and coolant/lubricant supply arrangement can be coupled via the tool carrier and in each case handled as a unit. This interface can be standardised, so to speak, so that any desired combinations of this kind can be used without a significant expense and with minimisation of the required set-up times.

In this connection the delivery and removal of individual tool carriers to the magazine and from the latter likewise plays an important part. According to the invention, the transfer and take-over of a tool carrier with corresponding machining tool and coolant/lubricant supply arrangement associated therewith can also be standardised through simple measures. In this connection each tool carrier can have a retaining structure, in particular a retaining pin arrangement, for attaching to the tool carrier magazine in a detachable manner. The tool carrier magazine has a corresponding holding arrangement with openings for the retaining pin arrangement.

According to a further constructional variant, the device according to the invention can also have a workpiece changing mechanism for receiving and changing the workpiece to be machined. In this respect the workpiece changing mechanism can have a workpiece changing arm which is attached to the machining mechanism and can be pivoted about a changing arm pivot axis relative to the machining mechanism towards a workpiece magazine. The machining mechanism can thus be brought via the compound slide arrangement into a desired position relative to the rotational workpiece to be changed in order to change the workpiece. Afterwards the workpiece changing arm can act on the rotational workpiece and place this in the workpiece magazine by pivoting, for example upside down through 180°. The workpiece changing arm can subsequently remove a further rotational workpiece to be machined from the workpiece magazine.

According to a further embodiment of the invention, the workpiece positioning mechanism can be attached to a hollow column portion of the machine base and be displaceable relative to the machine base along this column portion in the vertical direction, and a counterweight adapted to the workpiece holding mechanism and coupled to the workpiece positioning mechanism can be guided in the hollow space provided in the column portion. In other words, the workpiece positioning mechanism can be deflected by means of a rope or a chain guided over a pulley at the column portion on the top side and coupled to a counterweight. On account of the balanced weight ratios between the workpiece positioning mechanism and the counterweight, only small actuating forces are required for the actual displacement of the workpiece holding mechanism in the vertical direction, which permits a correspondingly low-powered design of the motor-operated drive provided for this purpose, with a responsivity which is nevertheless rapid. Due to the hollow form of the column portion, the counterweight can be accommodated in a space-saving manner, with this being guided in the hollow space at the same time.

A further aspect to be taken into account when machining complex rotational workpieces lies in the fact that the relative position between the rotational workpiece and the machining mechanism must be exactly determined on account of the complex geometries. This is essential in particular because different machining tools are also used, according to the machining situation. In this connection, according to one development of the invention, a multi-axis sensor, in particular a three-axis sensor, is provided on the workpiece positioning mechanism, by means of which sensor a position of the machining tool relative to the workpiece positioning mechanism and the workpiece attached to this can be detected. The exact relative position in space between the workpiece positioning mechanism and the machining mechanism can be accurately detected by means of the three-axis sensor.

According to one advantageous development of the invention, a truing tool for truing the machining tool can be provided on the workpiece positioning mechanism. This enables the machining tool, for example a grinding wheel, to be re-trued between two machining steps or regular intervals, so that wear-induced material removal, which can lead to irregular machining results, at the grinding wheel can be eliminated.

The invention is illustrated in the following by way of example in the light of the accompanying figures, in which.

Figure 1:
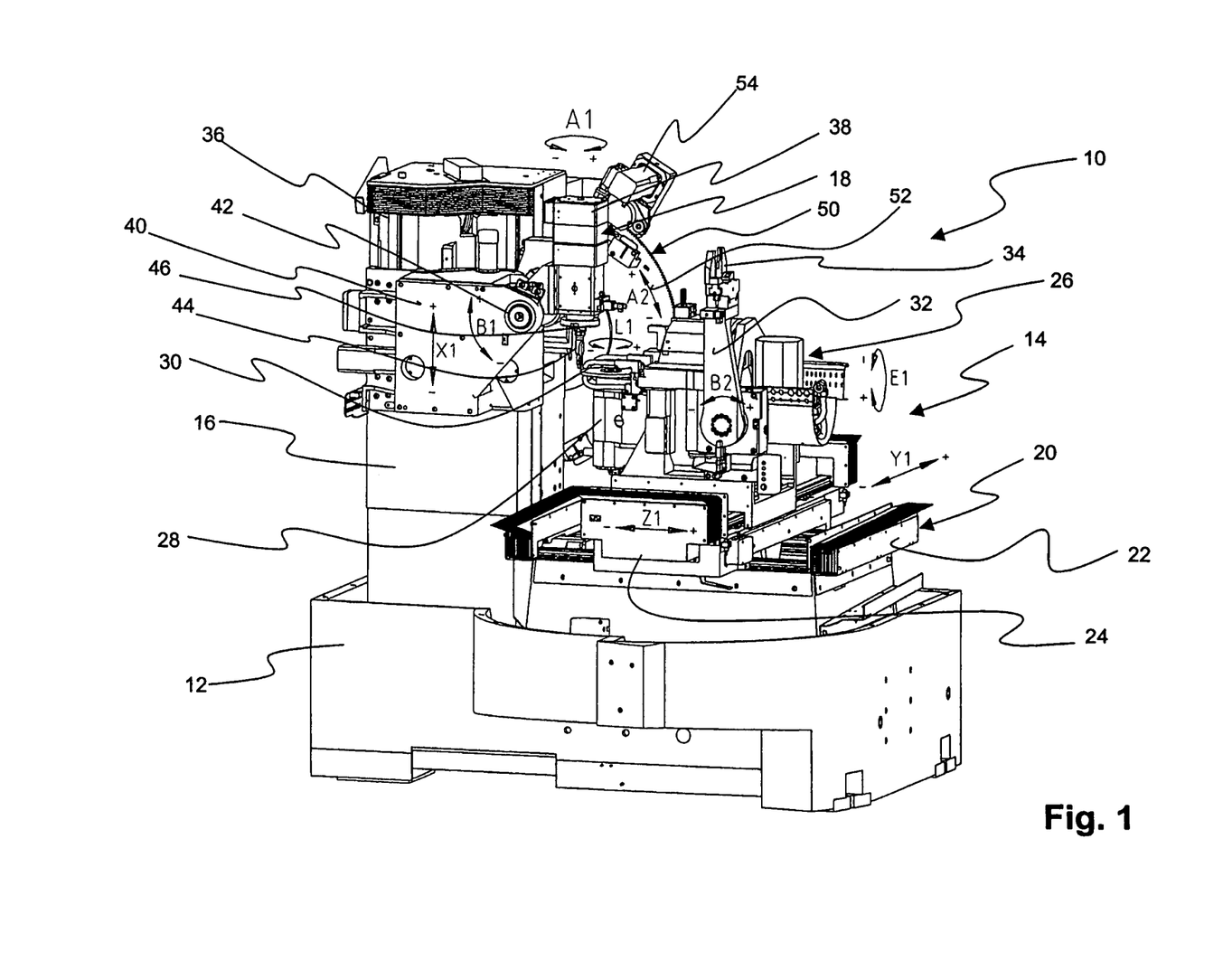
FIG. 1 is a perspective general view of the device according to the invention.

FIG. 1 shows in a perspective general view a device according to the invention which is generally marked by the reference number 10. This device 10, which is formed as a grinding and eroding machine, has a machine base 12, to which a machining mechanism 14 is attached. The machine base 12 has a column structure 16, to which a workpiece positioning mechanism 18 is attached.

The machining mechanism 14 has a compound slide arrangement 20, with a first slide 22, which can travel along the direction Z1, and with a second slide 24, which can travel along the direction Y1. The two slides as well as all further axes for displacing machine components are in each case controlled in CNC.

A machining head 26, which has a machining spindle 28 at its area which is on the left in FIG. 1, is attached to the slide arrangement 20. At its end which is at the top in FIG. 1 the machining spindle 28 can be coupled to a tool carrier mechanism 90 which is illustrated in detail in the following and has a machining tool 30. The machining tool 30, in the represented case a grinding wheel, can be driven so as to rotate about an axis of rotation L1.

The machining spindle 28 can be rotated as desired at the machining head 26 about an axis of rotation E1, in particular into the illustrated vertical position, although also into horizontal positions.

A workpiece changing mechanism in the form of a workpiece changing arm 32 is also attached to the machining head 26. This workpiece changing arm 32 can be pivoted about a changing arm pivot axis B2. It has a gripper 34 at its end which is at the top in FIG. 1.

Turning now to the workpiece positioning mechanism 18, it is evident that this can also be displaced along the column structure 16 via guides 36 along the direction X1. The workpiece positioning mechanism 18 also has a workpiece holding spindle 38. This workpiece holding spindle 38 can be driven so as to rotate, as indicated by the rotary arrow A1. The workpiece holding spindle can in addition be tilted to a certain degree at the slide 40, which can be displaced in the vertical direction X1, about a pivot axis B1 at a pivot bearing 42.

Also to be seen in FIG. 1 is a rotational workpiece 44, which is held in a rotationally rigid manner and clamped at a workpiece holding mechanism 46. The rotational workpiece 44 is an end milling cutter which has to be machined at individual cutting edges by means of the grinding wheel 30.

FIG. 1 also shows a magazine 50 having a magazine disc 52 which is rotatable according to the rotary arrow A2. The magazine disc 52 is provided with an encircling external tooth system and can be driven so as to rotate via the rotary drive 54.

The device 10 according to the invention, as is shown in FIG. 1, has the special feature of the rotational workpiece 44 to be machined being attached to the workpiece positioning mechanism 18 in a vertically suspended arrangement. It can be machined by the machining mechanism 14 in this suspended arrangement. In this connection the machining tool 30 is oriented in the horizontal direction in relation to the rotational workpiece 44 via the compound slide arrangement 20. Moreover, the machining tool 30 can also be pivoted by pivoting the machining spindle 28 according to the axis E1. The rotational workpiece 44 is positioned in the direction X1 by displacing the slide 40 at the column structure 16. If required, the rotational workpiece 44 can also be tilted about the axis B1 in order to be able to machine complicated geometries on the functional portion to be machined of the rotational workpiece 44.

The functional workpiece 44 can be removed from the workpiece positioning mechanism 18 following machining via the workpiece changing arm 32. The travelling movements are effected via the compound slide arrangement 20 as well as the additional slide 40 for this as well. The workpiece changing arm 32 can be rotated about the axis B2 through at least 180°, so that, following removal from the workpiece positioning mechanism 18, the rotational workpiece 44 can be inserted "upside down", as it were, in a magazine, which is not shown in FIG. 1, and a further workpiece to be machined can subsequently be removed from this magazine and then again inserted in the workpiece positioning mechanism 18.

The magazine 50 serves to hold a plurality of machining tools 30. Depending on requirements, the machining mechanism 14 can be equipped with a suitable machining tool 30 which is held in the magazine 50. The desired machining tool is rotated into a transfer position by appropriately rotating the rotary disc 52. The machining mechanism 14 can be positioned accordingly by means of a travelling movement on the compound slide arrangement 20 as well as by pivoting the spindle 28 about the axis E1 for delivering and for receiving a new machining tool.

FIG. 1 shows as a whole that the device according to the invention provides a compact machine with which complex machining tasks can be managed, as arise when machining rotational workpieces. An important advantage of this machine lies in the fact that the rotational workpiece 44 can be machined in a suspended orientation, so that gravitation-induced loads, which occur as bending loads in particular in the case of long, shank-like rotational workpieces, can be prevented. Chips and removed material occurring during machining fall downwards, so that they do not contaminate the workpiece positioning mechanism 18 and, in particular, the workpiece holding mechanism 46.

Figure 2:
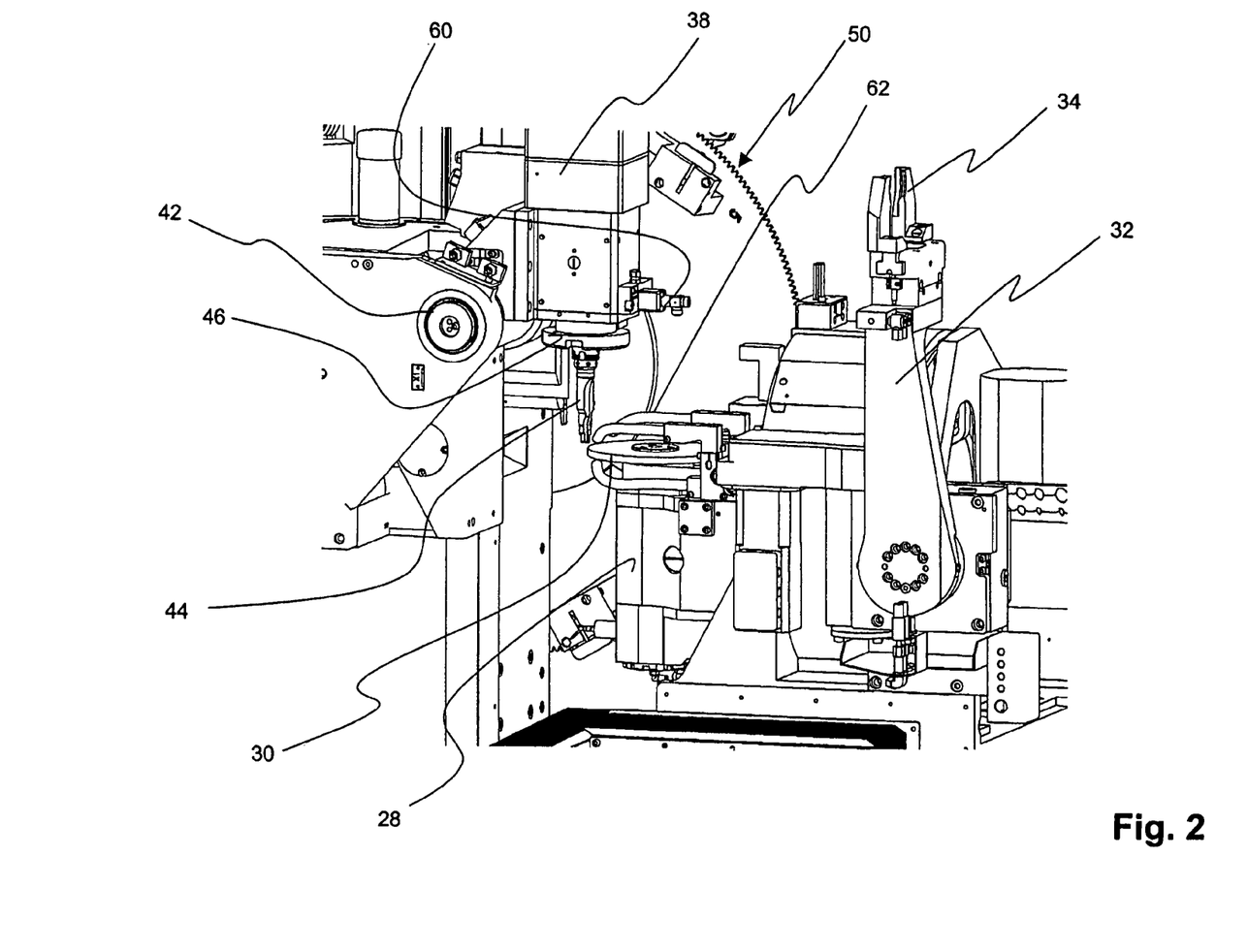
FIG. 2 is an enlarged detail from the perspective view of FIG. 1 representing the machining situation in detail.

FIG. 2 shows an enlarged detail which represents a specific machining situation. Evident in the central area of FIG. 2 is the rotational workpiece 44 which is to be machined and is held and firmly clamped in the workpiece holding mechanism 46 by way of its holding portion, which is not shown. The rotational workpiece 44 is oriented substantially vertically, i.e. the workpiece holding spindle 38 is arranged such that its axis of rotation is directed substantially vertically. A sensor arrangement 60 for referencing can also be seen on the workpiece holding spindle 38. This will be discussed in detail in the following.

The machining tool 30 is brought up to the bottom end of the suspended rotational workpiece 44 for machining a cutting edge of its functional portion. The machining spindle 28 is likewise oriented vertically in the represented situation for this purpose. Pipes 62 serving to supply coolant/lubricant to the machining location are provided above and below the machining tool 30. These pipes 62 are accurately adapted to the machining tool 30 in terms of their arrangement and geometry. They are arranged at a tool carrier, which loosely carries the machining tool 30, and the unit consisting of the tool carrier, pipes 62 and machining tool 30 can be transferred to the magazine 50 and removed from the latter as a whole.

The workpiece changing arm 32 with its gripper 34 is located in a passive position, in which it is disposed substantially vertically.

It is also evident in FIG. 2 that the rotational workpiece 44 is of a relatively complex geometry with a plurality of functional surfaces which have to be machined in detail. This necessitates bringing the machining tool 30 and likewise the rotational workpiece 44 into the most varied relative positions through translational movements and tilting movements in relation to one another. All these relative positions can be achieved with the device according to the invention, the latter at the same time having a compact form. The essential advantage, which is shown in a particular way in FIG. 2, lies in the suspended arrangement of the rotational workpiece to be machined.

The following advantages in particular are obtained with the illustrated arrangement:

The rotational workpiece 44 is not subject to any gravitation-induced bending loads in a clamping situation with a purely vertical orientation. The bending loads are negligible even when pivoting about the pivot axis B1.

Because it is arranged above the machining location, the workpiece holding mechanism 46 is not contaminated by removed material and chips occurring during machining.

Vibrations at the rotational workpiece to be machined which are caused by translational movements only occur to a minimal degree in its longitudinal direction. Because this workpiece does not undergo any translational displacement, no transverse vibrations occur. Machining times can thereby be shortened, as it is not necessary to "steady" a displaced workpiece in order to reduce vibrations.

In many machining situations the rotational workpieces are machined as they are subsequently also used. This can be seen particularly well in FIG. 2, where a milling cutter, which is usually also used in a suspended arrangement in the milling machine, is machined in a corresponding arrangement.

Figure 3:
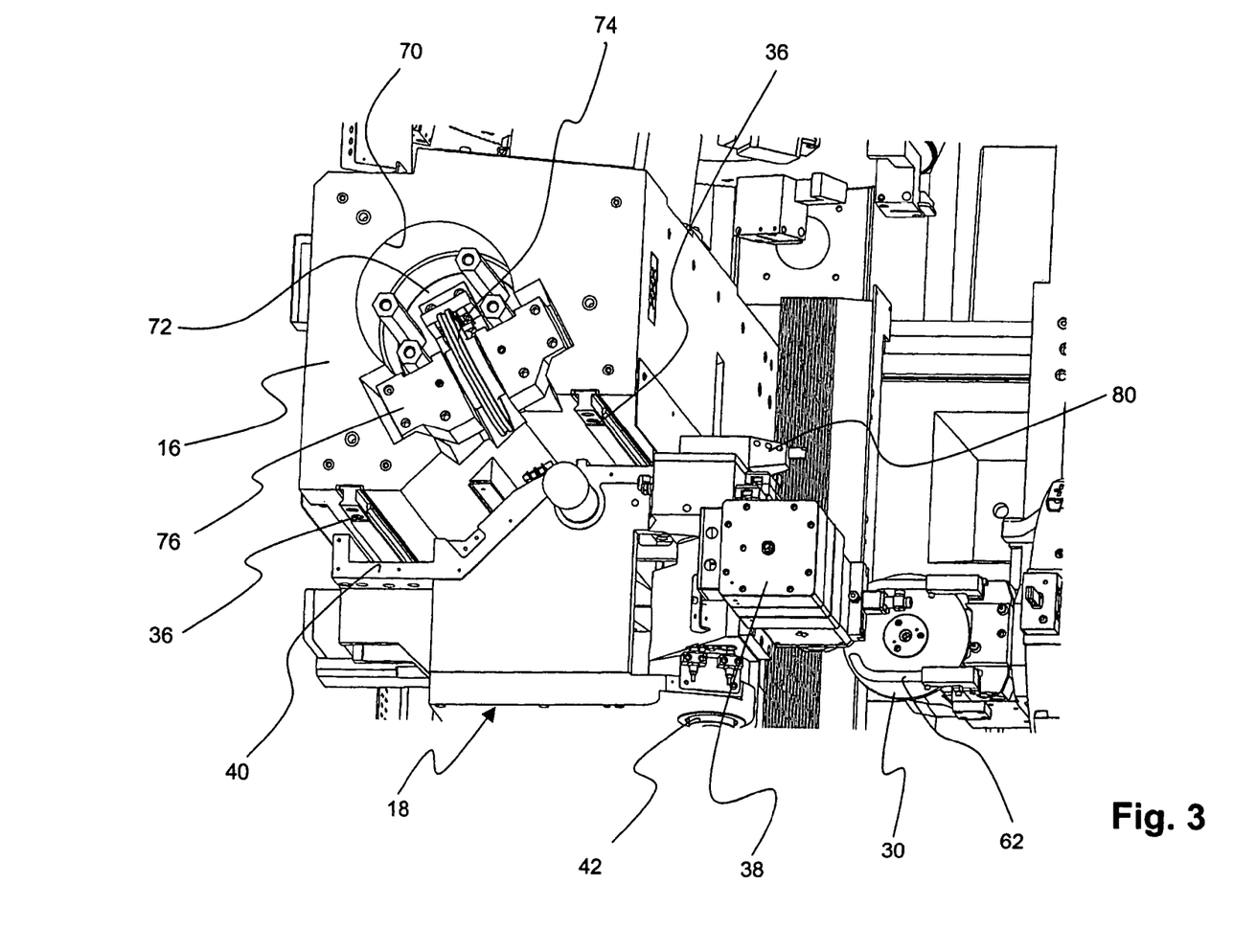
FIG. 3 is a perspective view of the device according to the invention from above.

The column structure 16 of the machine base can be seen in a plan view in FIG. 3. As can be seen, this column structure 16 is formed with a hollow space 70. A counterweight 72 is held such that it is guided in the vertical direction in this hollow space 70. This counterweight 72 is connected to the slide 40, which can be displaced in the vertical direction, via a rope, which is not shown, in the manner of a pulley block. The rope is guided over a pulley 74 which is mounted on the column structure. The pulley 74 is mounted with little friction in laterally arranged bearing arrangements 76.

By coupling the slide 40, on which the workpiece positioning mechanism with the workpiece holding spindle 38 is arranged, to the counterweight 72 via the rope guided over the pulley 74, the weight of the workpiece positioning mechanism 18 can be "neutralised", so that, in spite of its considerable own weight, this can be displaced into a vertical position with a relatively low expenditure of force for positioning the rotational workpiece. Exact positioning is effected by an actuating drive, which is not shown in detail, as well as the linear guides 36, which are attached to the column structure 16.

Also to be seen in FIG. 3 is a truing mechanism 80, with which the machining tool 30, for example a grinding wheel, can be trued if required. In the illustrated representation the truing mechanism 80 is in the form of an upright truing mechanism, i.e. for its part it only moves in translational, but not rotational, fashion. It is alternatively also possible to provide a rotational truing mechanism, for example with a rotating truing wheel.

Figure 4:
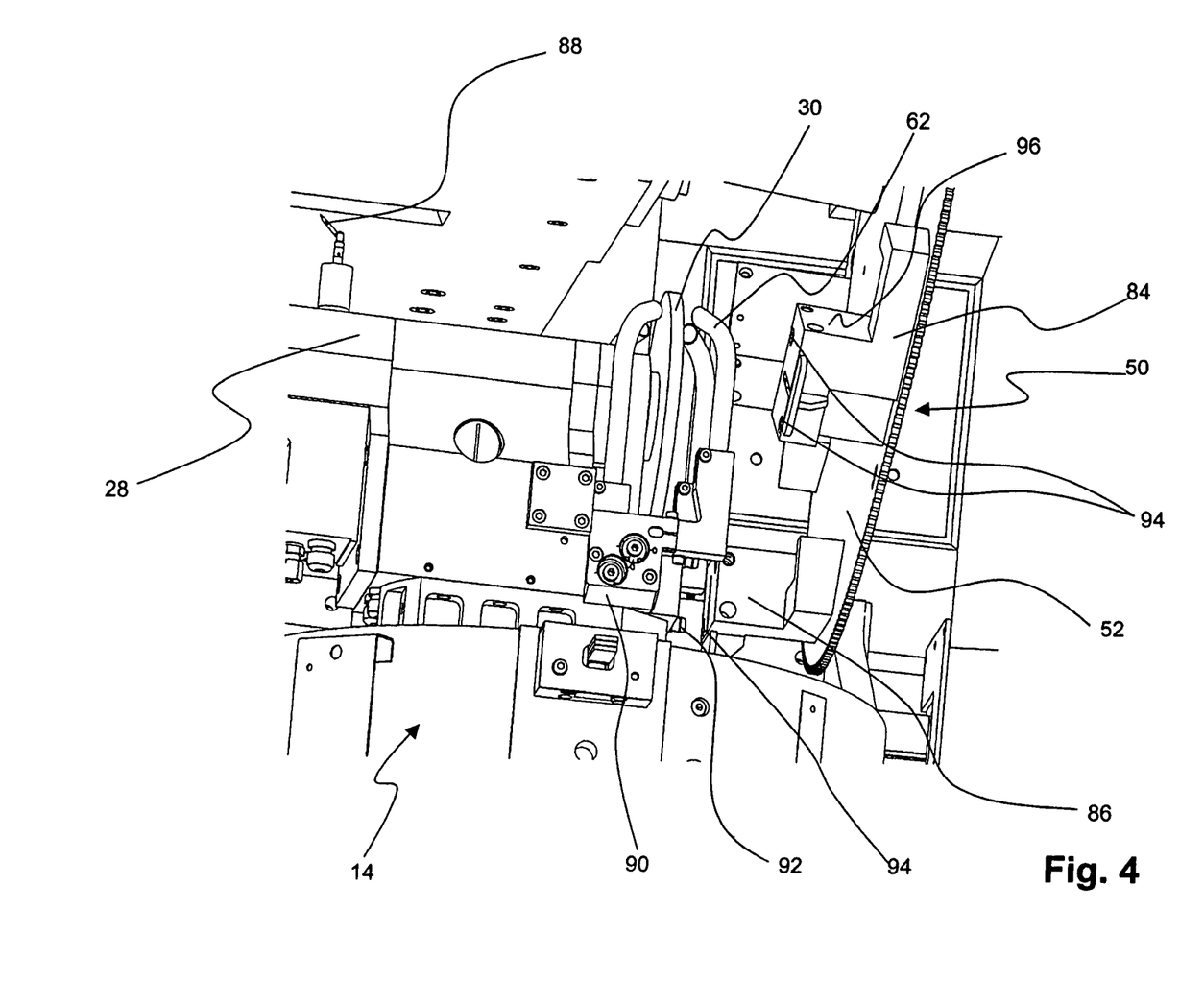
FIG. 4 is a perspective detail representation for illustrating the transfer of a tool carrier to the magazine.

FIG. 4 shows the situation at the magazine 50. A plurality of tool holders 84, 86 are distributed over the circumference at the rotary disc 52 of the magazine 50. The machining mechanism 14 has been brought up to the magazine 40 via the compound slide arrangement 20, which is not shown, with the machining spindle 28 being rotated into a horizontal position at the same time. It can also be seen in FIG. 4 that a tactile sensor 88 is also attached to the machining spindle 28, this serving to sense the rotational workpiece before and after machining.

FIG. 4 also shows the tool carrier 90, as it has just been brought up to the tool holder 86 in the magazine 50. Although the structure of the tool carrier 90 is also explained in detail in the following, it is to be observed that this has retaining pins 92 which can be inserted in corresponding openings 94 in the tool holder 86. The tool holder 86 (likewise 84) also has retaining surfaces 96 against which the tool carrier can lie.

Figure 5:
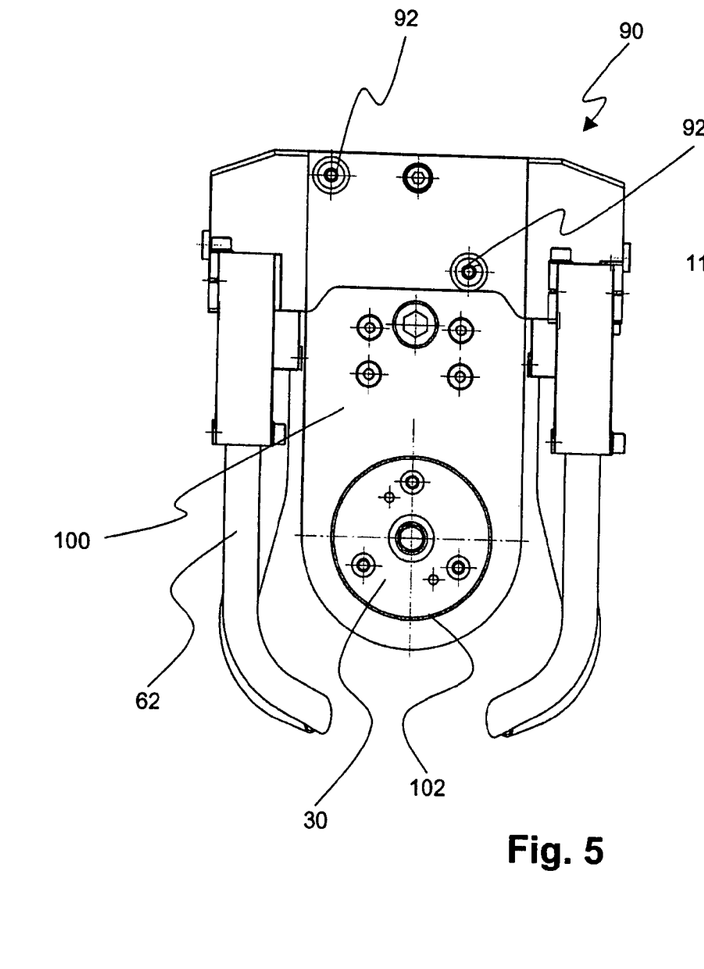
FIG. 5 is a front view of a tool carrier with tool and coolant/lubricant supply arrangement.
Figure 6:
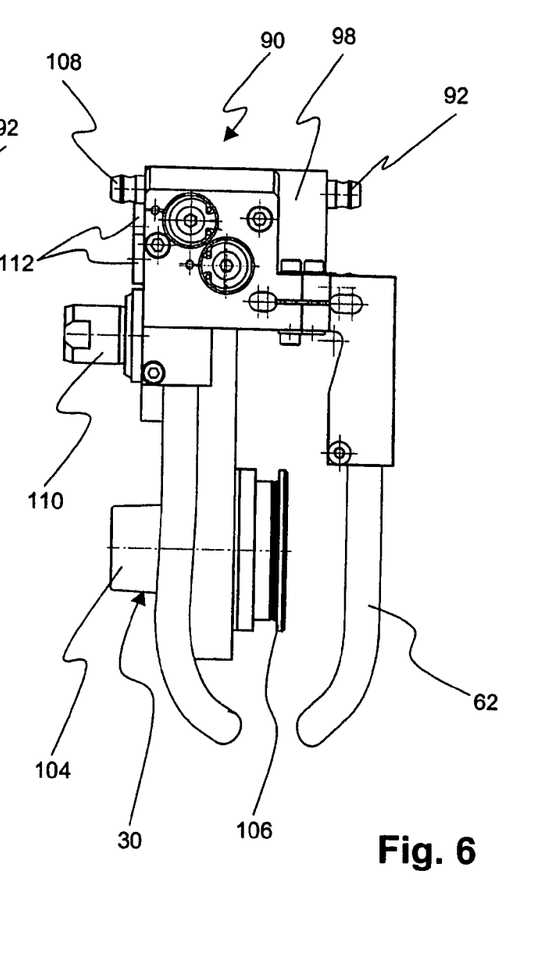
FIG. 6 is a side view of the tool carrier from FIG. 5.
Figure 7:
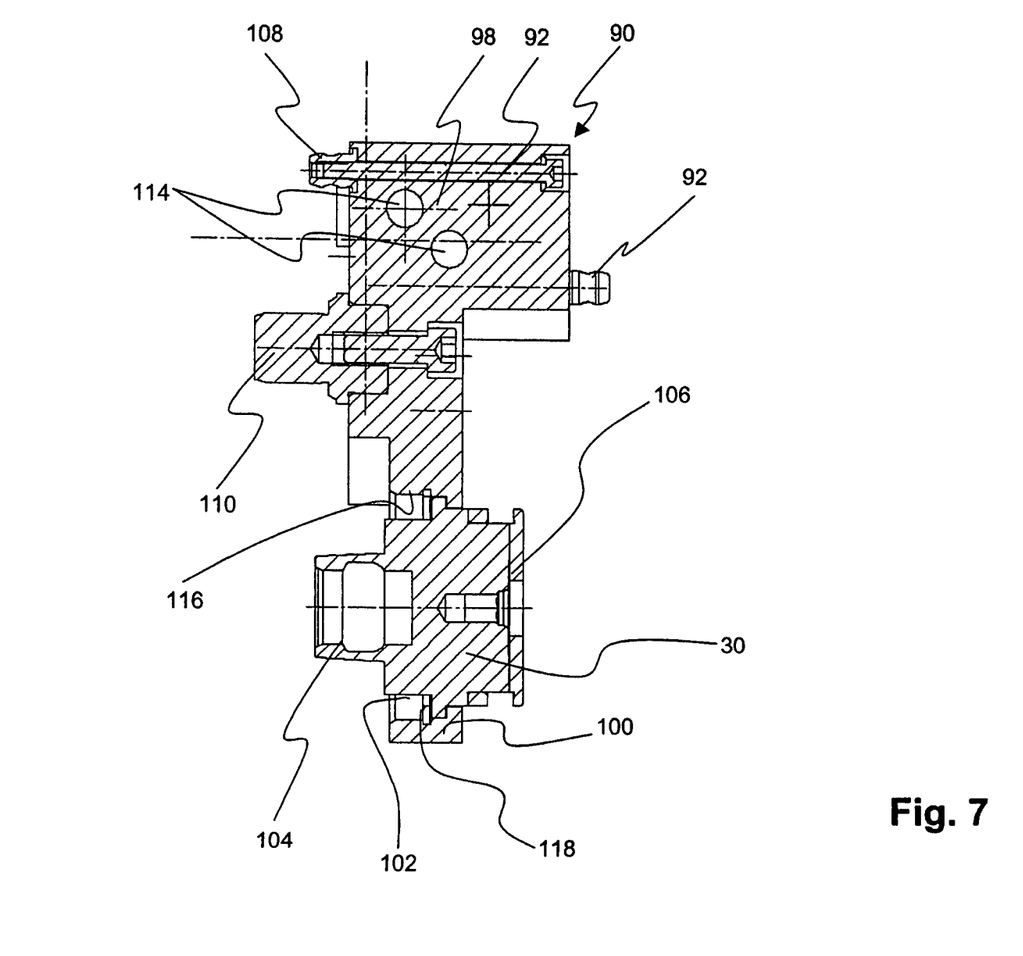
FIG. 7 is a sectional view of the tool carrier according to FIG. 6.

Representations of the tool carrier 90 are shown in different views in FIGS. 5, 6 and 7. It can be seen that the tool carrier has a base 98 to which a carrier plate 100 is attached. The carrier plate 100 has a central opening 102 in which the actual machining tool 30, in the illustrated case a grinding wheel, is held. The machining tool 30 comprises a holding cone 104 to be held in the machining spindle and a disc-shaped grinding body flange 106.

The opening 102 is formed in a stepped manner with undercuts and loosely holds the machining tool 30, so that it can rotate about its central axis of rotation in the plate 100.

The retaining pins 92 for attaching to the magazine are attached to the base 98. Further retaining pins 108, which serve for attaching to, in particular positioning on, the machining mechanism, are in addition provided on the base. Also provided for this purpose is a fixing peg 110, with which the tool carrier 90 is firmly fixed to the machining mechanism. Also to be seen in FIG. 6 are coupling nozzles 112 in a side view, these serving for the fluidic coupling of fluid channels integrated in the base 98. These fluid channels communicate in fluidic terms with the pipes 62 for supplying coolant and lubricant to the machining location.

The longitudinal sectional representation through the tool carrier 90 according to FIG. 7 shows the structure of the latter, the base 98 being formed integrally with the plate 100. The fluid channels 114 for carrying the coolant/lubricant to the pipes 62, which are not shown, can be seen in the base 98. The peg 110 fastened to the tool carrier can also be seen. Finally, the machining tool 30 can also be seen in section, as well as the stepped inner surface 116 of the opening 102, in which the tool is rotatably retained and secured against falling out by a retaining ring 118.

Figure 8:
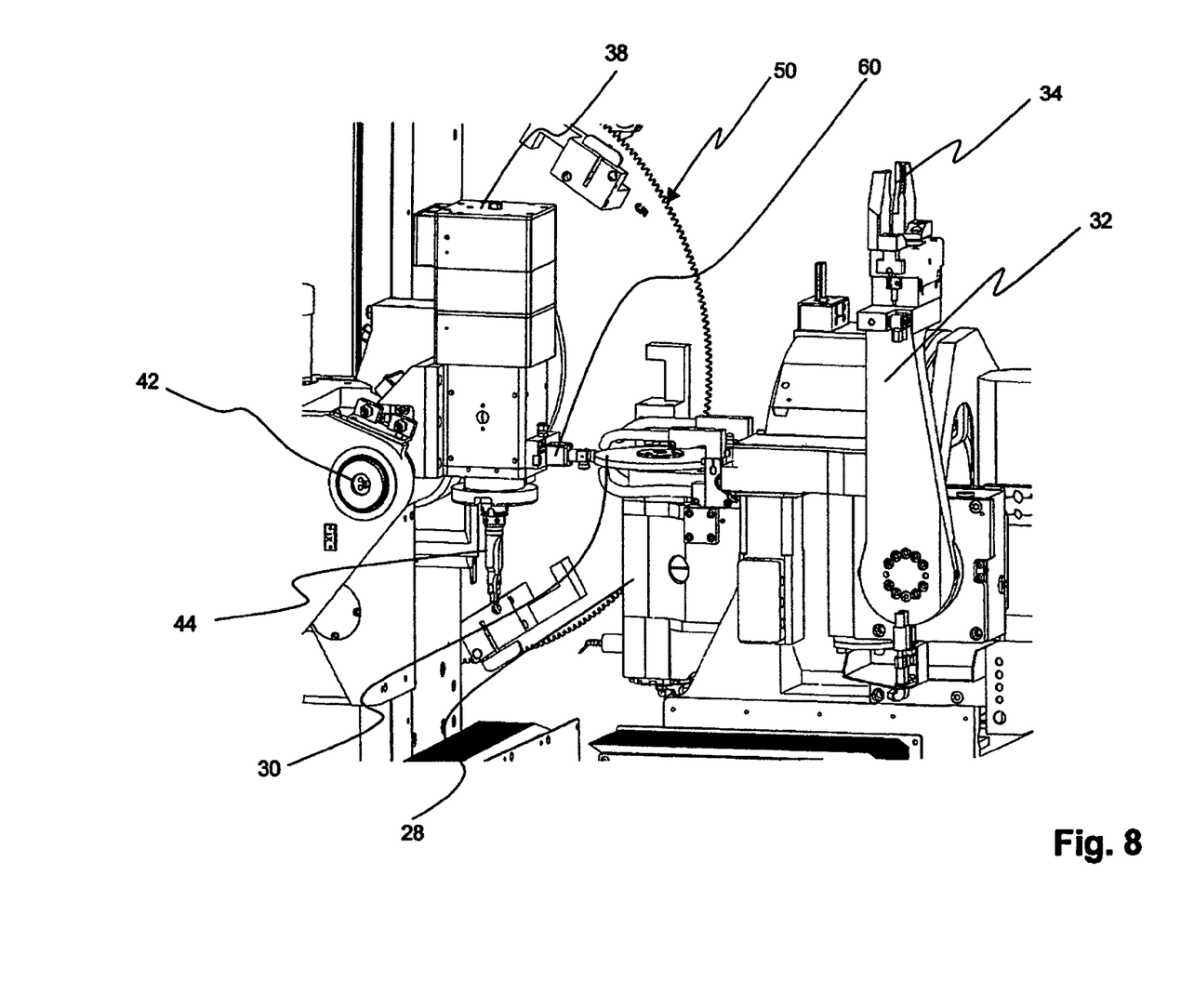
FIG. 8 is a perspective view for illustrating a referencing situation between the workpiece positioning mechanism and the machining tool.

FIG. 8 shows a referencing situation in which the relative position between the workpiece positioning mechanism, in particular the workpiece holding spindle 38 and therefore the rotational workpiece 44, and the machining tool 30 is established by means of the sensor arrangement 60. The sensor arrangement 60 is formed as a three-axis sensor. In FIG. 8 the relative position with regard to the direction Z1 (see FIG. 1), i.e. in the horizontal transverse direction, is just being established. The three-axis sensor is a high-sensitive contact sensor which responds even at a force of a few millinewtons. It could also be formed as a contactless proximity sensor as an alternative to its configuration as a contact sensor.

The position of the tool 30 and its machining faces can thus be established in the immediate spatial vicinity of the rotational workpiece 44 to be machined. An exact orientation of the rotational workpiece 44 on the one hand and the machining tool 30 on the other in relation to one another can thereby be obtained, so that high-precision machining operations of a high quality can be carried out.

Figure 9:
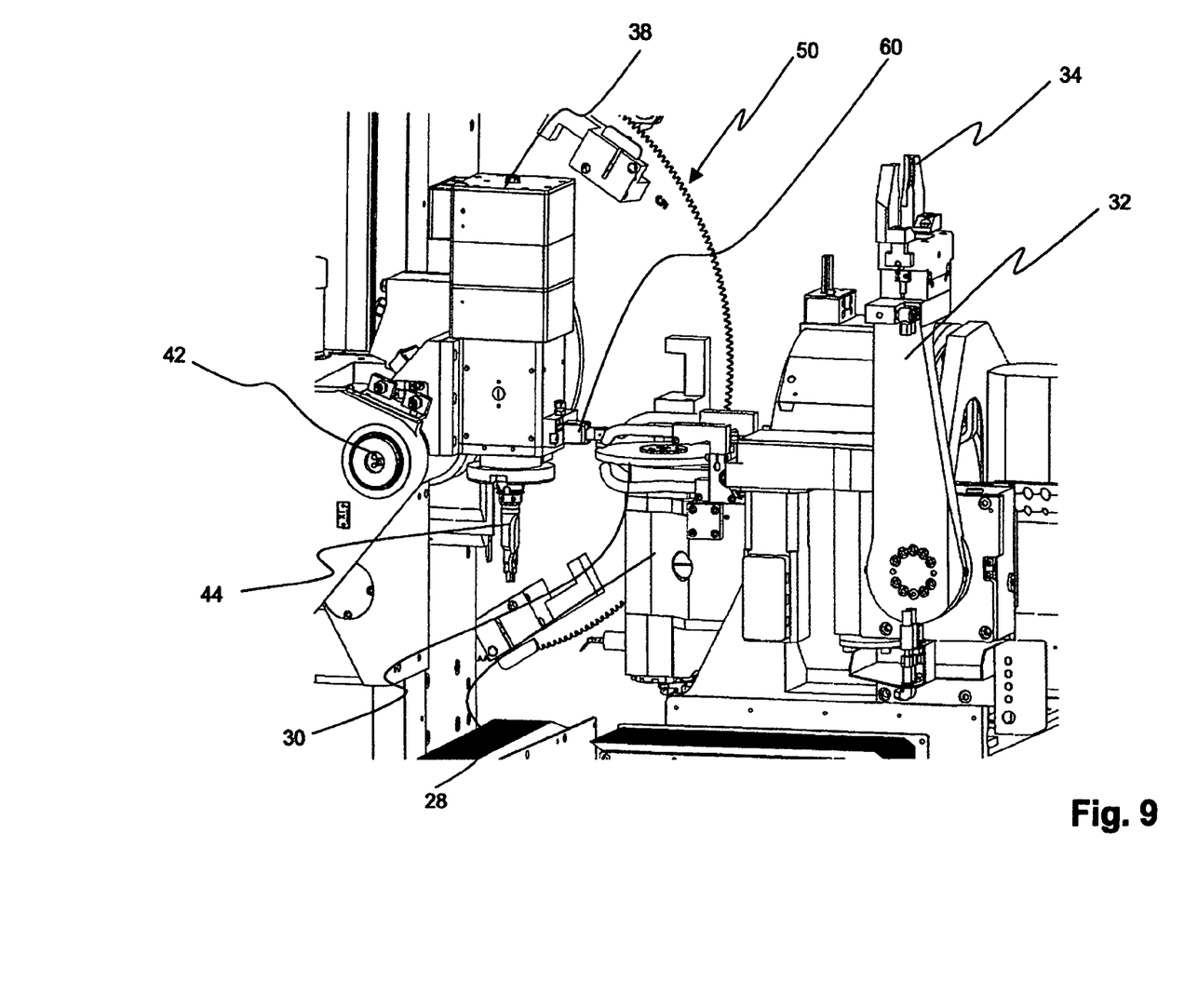
FIG. 9 is a perspective view for illustrating a further referencing situation between the workpiece positioning mechanism and the machining tool.

FIG. 9 shows a similar referencing situation, although here the referencing takes place in the vertical direction X1 (see FIG. 1). The three-axis sensor 60 finds its way onto the machining tool 30 moving in the vertical direction (from above) and detects its relative position in this direction in relation to the rotational workpiece 44 to be machined.

Figure 10:
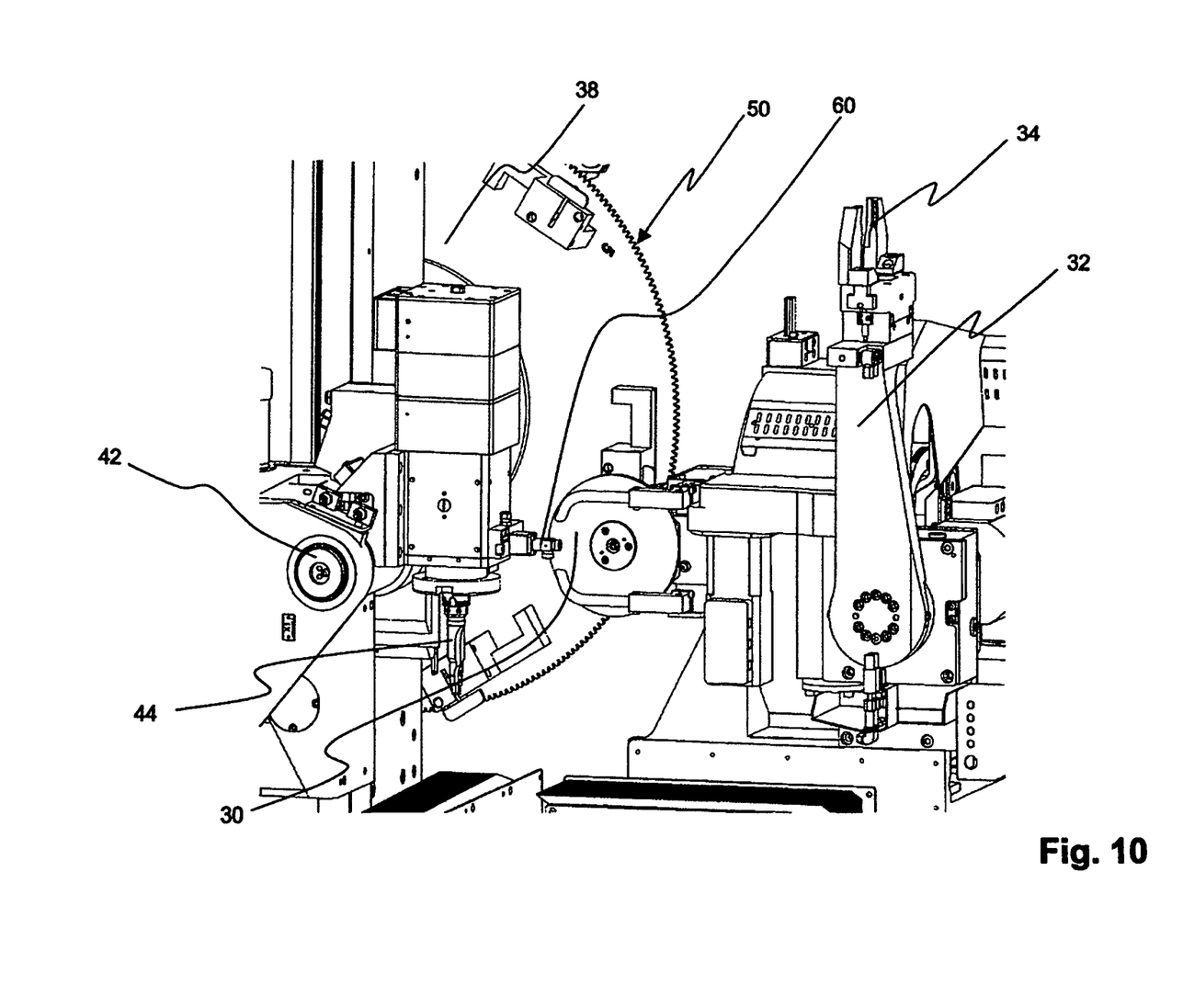
FIG. 10 is a perspective view for illustrating a further referencing situation between the workpiece positioning mechanism and the machining tool and FIG. 11 is an enlarged detail corresponding to FIG. 2 representing a further machining situation in detail.

FIG. 10 shows a further referencing situation. Here the machining spindle has been rotated through 90° into the horizontal position with respect to the orientation according to FIGS. 8 and 9. The machining tool 30 is sensed in the direction Y1 (see FIG. 1) via the three-axis sensor 60.

With regard to the referencing via the three-axis sensor 60, the device according to the invention affords the advantageous possibility of carrying out referencing in the process, i.e. during short machining pauses, for example after exchanging a machining tool. This enables machining errors arising from a tool change or on account of thermal dimensional changes to be prevented. It is therefore possible to compensate in advance for impairments of the machining result on account of wear on the tool or on account of the clamping situation of the tool because of the tolerances of the holding cone. Furthermore, referencing makes a plausibility check as well as a safety check possible, i.e. a check can be carried out as to whether the axes are disposed correctly in relation to one another, whether the tool and the rotational workpiece are disposed correctly in relation to one another, whether the correct tool has actually been clamped, etc. It is also essential in this respect for the three-axis sensor 60 to be arranged near the workpiece 44, so that disturbing influences, such as thermal expansion, bending, etc., can be kept to a minimum.

Figure 11:
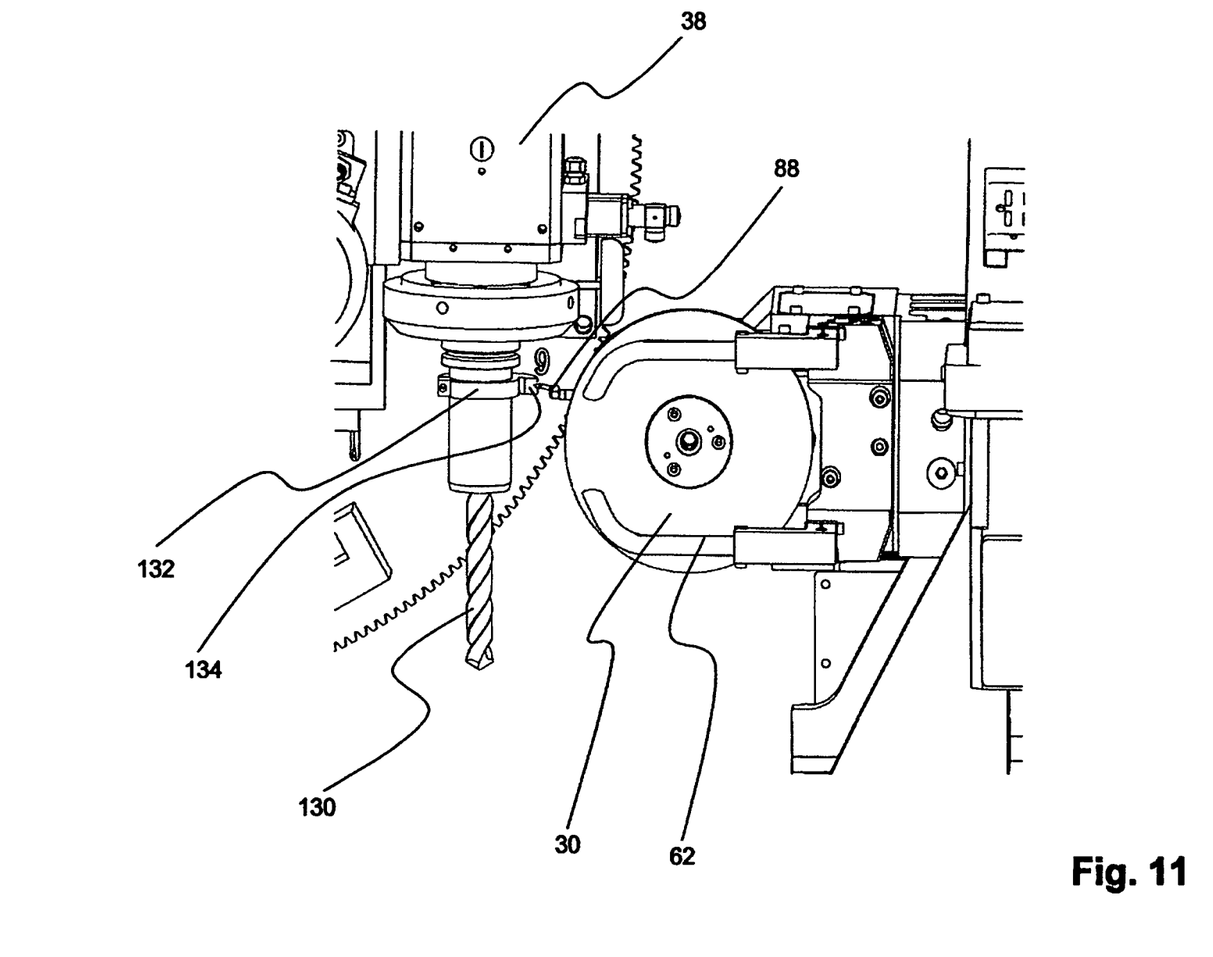

FIG. 11 shows a further machining situation in which a drill 130 is provided with a reference surface carrier 132 and clamped with a holding portion in the workpiece holding spindle 38. The reference surface carrier remains firmly clamped to the drill during the entire machining process and comprises a reference surface 134, which is just being detected by the measuring probe in the representation which is shown in FIG. 11. The reference surface carrier 132 is necessary when machining the drill because this has no specific reference surface with regard to which machining can be started and terminated. The drill is therefore provided before being machined with the reference surface carrier 132, which offers the reference surface 134 for measurement. The drill 130 can then be machined with regard to this reference surface.

The invention claimed is:

1. Device (10) for machining, in particular eroding and grinding, rotational workpieces (44) provided with cutting edges, with
    a machine base (12),
    a machining mechanism (14), which can be displaced relative to the machine base (12),
    and a workpiece positioning mechanism (18), which can be displaced relative to the machine base (12),
    wherein the machining mechanism (14) has at least one machining tool (30), which is attached in a rotatably drivable manner to a slide arrangement (20), which can be displaced in relation to the machine base (12), for machining a functional portion to be machined of the rotational workpiece (44), and
    wherein the workpiece positioning mechanism (18) has a workpiece holding mechanism (46), which can be displaced relative to the machine base (12) and holds a holding portion of the rotational workpiece (44) directly or via a holding adapter for attaching the rotational workpiece (44) to the workpiece positioning mechanism (18),
    characterised in that the workpiece holding mechanism (46) is oriented relative to the machine base (12) and holds the holding portion of the rotational workpiece (44) such that the rotational workpiece (44) is held in position with its functional portion suspended below a workpiece holding spindle 38 for machining, and
    characterised in that the workpiece positioning mechanism (18) has a spindle tilting mechanism (42) by means of which the workpiece holding spindle (38) can be pivoted about a spindle tilting axis (B1) such that the rotational workpiece (44) to be machined can be moved between a vertical position and a vertical oblique position below the workpiece holding spindle (38).

2. Device (10) according to claim 1, characterised in that the slide arrangement (20) has a first positioning slide (22) and a second positioning slide (24) with horizontally extending axes of motion (Z1, Y1) which are substantially orthogonal to one another.

3. Device (10) according to claim 1, characterised in that the machining mechanism (14) has a machining spindle (28) which can be driven so as to rotate about a machining spindle axis (L1).

4. Device (10) according to claim 3, characterised in that the machining mechanism (14) has a spindle pivoting mechanism by means of which the machining spindle (28) can be pivoted about a spindle pivot axis (E1) such that the machining spindle axis (L1) can be brought both into a horizontal and into a vertical position.

5. Device (10) according to claim 1, characterised in that the workpiece positioning mechanism (18) has a workpiece holding spindle (38) which can be driven so as to rotate about a workpiece holding spindle axis (A1).

6. Device (10) according to claim 1, characterised in that the machining mechanism (14) can be coupled to a tool carrier (90) on which a machining tool (30) and a lubricant supply arrangement (62) associated therewith are provided.

7. Device (10) according to claim 6, characterised in that the a plurality of tool carriers (90) can be attached to a tool carrier magazine (50), which can be rotatably driven and is in particular disc-shaped or pallet-like.

8. Device (10) according to claim 7, characterised in that each tool carrier (90) has a predefined interface for fixing to the machining mechanism (14), for connecting a lubricant supply and for coupling the machining tool (30) to the machining spindle (28).

9. Device (10) according to claim 7, characterised in that each tool carrier (90) has a retaining structure, in particular a retaining pin arrangement (92), for attaching to the tool carrier magazine (50) in a detachable manner.

10. Device (10) according to claim 1, characterised by a workpiece changing mechanism (32) for receiving and changing the rotational workpiece (44) to be machined.

11. Device (10) according to claim 10, characterised in that the workpiece changing mechanism has a workpiece changing arm (32) which is attached to the machining mechanism and can be pivoted about a changing arm pivot axis (B2) relative to the machining mechanism (14) towards a workpiece magazine.

12. Device (10) according to claim 1, characterised in that the workpiece positioning mechanism (18) is attached to a hollow column portion (16) of the machine base (12) and is displaceable relative to the machine base (12) along this column portion (16) in the vertical direction, and that a counterweight (72) adapted to the workpiece holding mechanism (46) and coupled to the workpiece positioning mechanism (18) is guided in the hollow space (70) provided in the column portion (16).

13. Device (10) according to claim 1, characterised in that a multi-axis sensor (60), in particular a three-axis sensor, is provided on the workpiece positioning mechanism (18), by means of which sensor a position of the machining tool (30) relative to the workpiece positioning mechanism (18) and the rotational workpiece (44) attached to this can be detected.

14. Device (10) according to claim 1, characterised in that a truing tool (80) for truing the machining tool (30) is provided on the workpiece positioning mechanism (18).

15. Device (10) for machining, in particular eroding and grinding, rotational workpieces (44) provided with cutting edges, with
a machine base (12),
a machining mechanism (14), which can be displaced relative to the machine base (12) during the machining of the rotational workpiece (44),
and a workpiece positioning mechanism (18), which can be displaced relative to the machine base (12) during the machining of the rotational workpiece (44),
wherein the machining mechanism (14) has at least one machining tool (30), which is attached in a rotatably drivable manner to a slide arrangement (20), which can be displaced in a first substantially horizontal direction (Y1), in a second substantially horizontal direction Z1 and pivoted about an axis (E1) relative to the machine base (12), for machining a functional portion to be machined of the rotational workpiece (44), and
wherein the workpiece positioning mechanism (18) has a workpiece holding mechanism (46), which can be displaced relative to the machine base (12) and holds a holding portion of the rotational workpiece (44) directly or via a holding adapter for attaching the rotational workpiece (44) to the workpiece positioning mechanism (18),
characterised in that the workpiece holding mechanism (46) is oriented relative to the machine base (12) and holds the holding portion of the rotational workpiece (44) such that the rotational workpiece (44) is arranged with its functional portion suspended below a workpiece spindle 38 and is moveable in a substantially vertical direction (X1), moveable about a pivot axis (B1), and moveable about a rotational axis (A1) during a machining operation.

16. Device (10) according to claim 15, characterised in that the machining mechanism (14) and the workpiece positioning mechanism (18) can move relative to each other in a coordinated manner during machining of the rotational workpiece (44).

* * * * *